United States Patent
Juenemann et al.

[11] Patent Number: 5,257,768
[45] Date of Patent: Nov. 2, 1993

[54] VIBRATION-DAMPING HOLDING ELEMENT FOR PIPELINES

[75] Inventors: Dietrich Juenemann, Loerrach; Wolfgang Schneider, Kandern-Wollbach; Werner Wolpensinger, Rheinfelden, all of Fed. Rep. of Germany

[73] Assignee: A. Raymond KG, Lorrach, Fed. Rep. of Germany

[21] Appl. No.: 800,911

[22] Filed: Dec. 4, 1991

[30] Foreign Application Priority Data

Dec. 13, 1990 [DE] Fed. Rep. of Germany ....... 4039822

[51] Int. Cl.$^5$ .............................................. F16L 3/08
[52] U.S. Cl. ................................... 248/604; 248/68.1; 248/73; 248/74.2
[58] Field of Search .................. 248/49, 65, 68.1, 74.1, 248/74.2, 74.4, 604

[56] References Cited

U.S. PATENT DOCUMENTS

| | | | |
|---|---|---|---|
| 3,065,941 | 11/1962 | Loftis | 248/604 |
| 3,606,218 | 9/1971 | Enlund et al. | 248/74.2 |
| 3,906,592 | 9/1975 | Sakasegana et al. | 248/68.1 |
| 4,881,705 | 11/1989 | Kraus | 248/74.2 |

FOREIGN PATENT DOCUMENTS

| | | | |
|---|---|---|---|
| 2162662 | 6/1973 | Fed. Rep. of Germany | 248/74.1 |
| 3019303 | 11/1981 | Fed. Rep. of Germany | 248/74.2 |
| 3544785A1 | 12/1985 | Fed. Rep. of Germany | |
| 3544785 | 6/1987 | Fed. Rep. of Germany | |
| 3907067 | 9/1990 | Fed. Rep. of Germany | 248/49 |
| 2248432 | 5/1975 | France | 248/74.2 |
| 1249258 | 8/1986 | U.S.S.R. | 248/74.1 |
| 2043157 | 10/1980 | United Kingdom | 248/68.1 |

Primary Examiner—David A. Scherbel
Assistant Examiner—Derek J. Berger
Attorney, Agent, or Firm—Finnegan, Henderson, Farabow, Garrett & Dunner

[57] ABSTRACT

A vibration-damping holding device for holding at least one pipeline having a holding body of a hard-elastic material and a receiving body of a soft-elastic material insertable into said holding body, the holding body having a lower part adapted to be anchored to a carrier plate, an upper part and resilient locking hooks for releasably connecting them to one another in a closed position, the upper and lower parts forming a cavity between them in the closed position for receiving the receiving body. The receiving body also has two parts that can be assembled together to form the body, each of the parts having an outer shell with an outer shape compatible with the cavity in the holding body and at least one semi-annular inner shell that cooperate as a pair with each other to hold a pipeline. The inner shells are connected to the outer shells by a plurality of annularly spaced spring struts that extend radially outward from the inner shell, the struts being V-shaped with the vertices of the V's pointing alternatively towards one side or the other relative to the axis of inner shells and the pipeline.

6 Claims, 1 Drawing Sheet

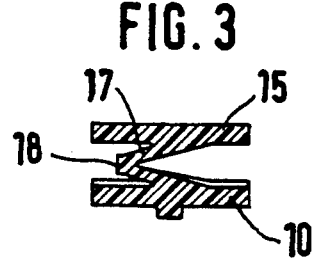
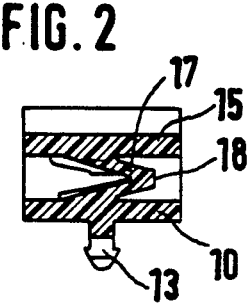
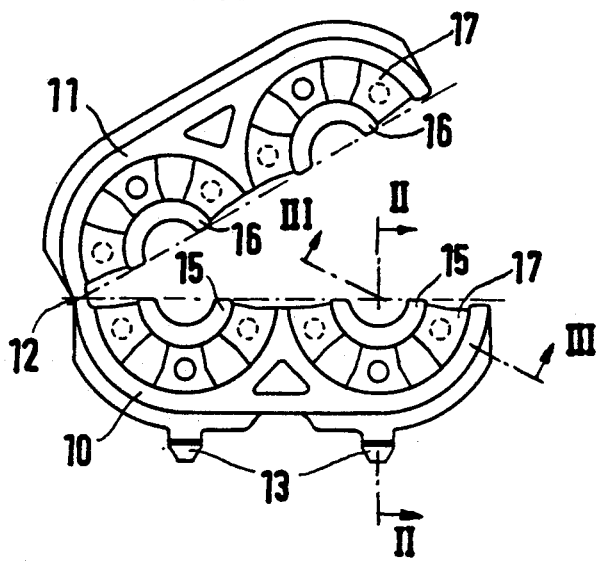
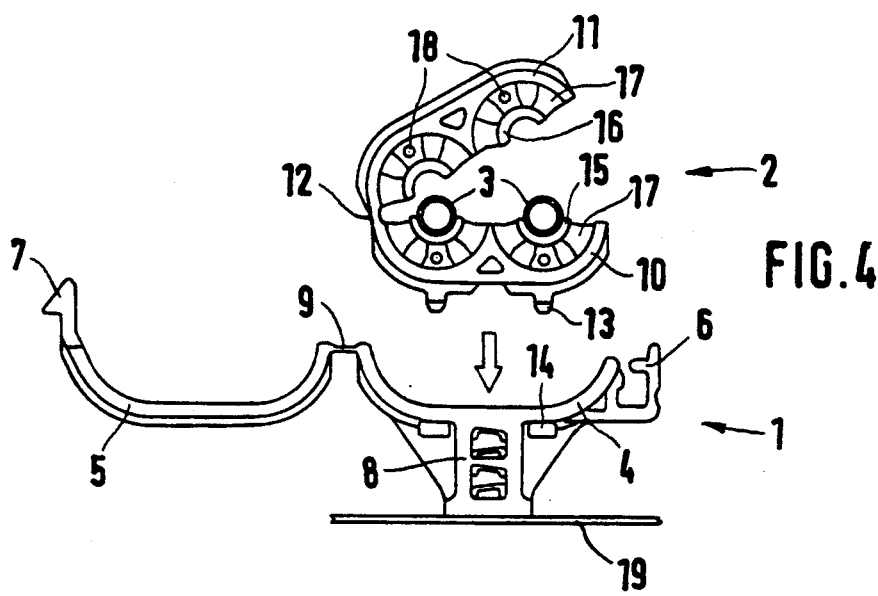
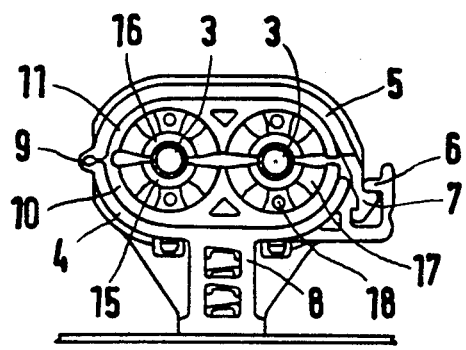

VIBRATION-DAMPING HOLDING ELEMENT FOR PIPELINES

BACKGROUND OF THE INVENTION

The invention relates to a vibration-damping holding element for pipelines and especially for brake lines of motor vehicles.

A holding element of this kind is known, for example, from German Patent No. 35 44 785 A1. This holding device is intended primarily as a sealing system for wall penetrations of lines such as brake lines and, accordingly, the receiving bodies are made of a very flexible material such as foam rubber or the like. At the same time, however, there also need to be a certain freedom of movement ensured for the brake lines. For this purpose, the receiving bodies have in their center semi-annular holding shells which are matched to the respective pipe diameters and are connected to the outer shells of the receiving body via outward-extending connecting members.

According to one of the illustrative embodiments shown, these connecting members can be formed by a radially extending dividing wall and, according to another illustrative embodiment, by two dividing walls aligned relative to one another approximately in the form of a cone, the semi-annular shells being divided by central recesses in the latter case. However, as indicated by the arrows in the drawing, it is primarily the wobbling motion of the brake lines which is taken into account by the last-mentioned dividing walls.

A vibration-damping effect, on the other hand, cannot be expected since the dividing walls are in both cases encircling dividing walls. The dividing walls integrally formed vertically or radially on the semi-annular shells in this case probably have even less of a damping effect for radially acting vibrations of the brake line than the integrally formed oblique dividing walls according to the second illustrative embodiment. However, the latter are more difficult to remove from the mold because of the recesses in the center and are therefore more expensive to manufacture.

It is the object of the invention, in the case of the holding element of the generic type, to design the mounting of the holding shells in such a way that they produce an optimum damping effect while being simple to manufacture.

SUMMARY OF THE INVENTION

This object is achieved according to the present invention by the fact that the connecting members are designed as spring struts which are bent in a V shape and the vertices of the bends of which—as seen in the axial direction of the holding shells—point alternately towards one side or the other.

By virtue of the favorable design of the spring struts as regards removal from the mold, an outstanding damping property is achieved by simple means. For as compact a design of the holding element as possible, it is furthermore advantageous if the spring struts are integrally formed both on the semi-annular holding shells and on the outer shells, approximately in the center of the shells.

BRIEF DESCRIPTION OF THE DRAWING

An illustrative embodiment of the invention is shown in the drawings and will be explained in greater detail below. In the drawings:

FIG. 1 is a side view of the receiving body according to the invention, in an open condition;

FIG. 2 is a sectional view through a receiving shell of the body with spring struts taken along the line II—II in FIG. 1;

FIG. 3 is another sectional view through the receiving shell taken along the line III—III in FIG. 1;

FIG. 4 shows the insertion of the receiving body into an opened holding part; and FIG. 5 shows the receiving body and holding part in the closed and mounted condition and with pipelines inserted.

DETAILED DESCRIPTION OF THE INVENTION

The holding element depicted in the figures is used for the vibration-damping holding of the pipelines and especially of brake lines of motor vehicles.

The holding element comprises a holding body 1 and a receiving body 2 for the pipelines 3 to be held, the receiving body being insertable into said holding body. In this arrangement, the holding body 1 is formed by two parts 4 and 5, which are hingedly connected to one another via a film hinge 9. In the present case, the holding body 1 is made of a hard-elastic material.

Provided on the two free ends of the parts 4 and 5 of the holding body are resilient locking means comprising cooperating hook-in elements 6 and 7, by means of which the lower part 4 and the upper part 5 can be connected to one another (FIG. 5).

The lower part 4 rests on a foot part 8, which can be anchored on a carrier plate 19 by anyone of customary fixing methods such as, for example, by screw or bolt connections (FIG. 4).

The receiving body 2 likewise comprises two parts each having an outer shell 10 and 11, which are made of soft-elastic material such as, for example, foam rubber or the like and can be hingedly connected to one another by a film hinge 12. Each outer shell 10 and 11 is matched in its outer region to the shape of the parts 4 and 5 of the holding body and can be inserted into these, the lower shell 10 being provided with locking lugs 13 which can be inserted and anchored in corresponding recesses 14 in the lower part 4 of the holding body 1.

In its center, each of the outer shells 10 and 11 has an inner holding shell 15 and 16, these being matched to the diameter of the pipelines 3 and being connected to their associated outer shells 10 and 11, respectively, approximately in the center of the shell via spring struts 17 bent in a V shape, giving a vibration-damping effect. The spring struts are uniformly distributed around the circumference of the two inner shells 15 and 16 are and bent in such a way that the vertices 18 of the bends—as seen in the axial direction—point alternately towards one side or the other of the receiving body in the axial direction of the inner shells 15, 16 and the pipelines 3.

We claim:

1. In a vibration-damping holding device for holding at least one pipeline having a holding body of a hard-elastic material and a receiving body of a soft-elastic material insertable into said holding body, the holding body having a lower part adapted to be anchored to a carrier plate, an upper part and resilient locking means for releasably connecting the parts to one another in a closed position, said upper and lower parts of the holding body forming a cavity between them in said closed position for receiving said receiving body, said receiving body having two parts that can be assembled together to form said receiving body, each of said receiving body parts having an outer shell with an outer shape compatible with the cavity of said holding body and at least one semi-annular inner shell, which inner shells cooperate as a pair with each other to hold a pipeline, wherein the improvement comprises connecting the semi-annular inner shells of said receiving body parts to said outer shells thereof by a plurality of uniformly and annularly spaced spring struts that extend radially outward from said inner shell, said struts being V-shaped, with the vertices of the V's pointing parallel to the axis of said semi-annular inner shells and alternately in opposite directions.

2. The holding device of claim 1, wherein the spring struts are integrally connected to both said semi-annular inner shells and said outer shells and the inner shells are centrally located relative to the outer shells.

3. The holding device of claim 1, including a plurality of pairs of inner shells connected to said outer shells for holding a plurality of pipelines.

4. The holding device of claim 1, wherein said upper part of the holding body is hingedly connected at one end to one end of said lower part thereof, said resilient locking means being located at the opposite free ends of said holding body parts, and the outer shells of the two parts of the receiving body are hingedly connected at one end to each other and at the same end as the upper and lower parts of the holding body are connected.

5. The holding device of claim 4, wherein the locking means comprises a pair of cooperating hook elements that can be elastically latched and unlatched.

6. The holding device of claim 4, wherein the outer shell of one of the two parts of the receiving body has locking lugs that can be inserted into and locked in place in corresponding recesses in the lower part of the holding body.

* * * * *